United States Patent
Yang (12)

(10) Patent No.: US 10,100,862 B2
(45) Date of Patent: Oct. 16, 2018

(54) SIMPLE ENGAGING DEVICE

(71) Applicant: Ya Yun Yang, Taichung (TW)

(72) Inventor: Ya Yun Yang, Taichung (TW)

( * ) Notice: Subject to any disclaimer, the term of this patent is extended or adjusted under 35 U.S.C. 154(b) by 401 days.

(21) Appl. No.: 14/982,670

(22) Filed: Dec. 29, 2015

(65) Prior Publication Data

US 2016/0108945 A1 Apr. 21, 2016

Related U.S. Application Data

(63) Continuation-in-part of application No. 13/786,797, filed on Mar. 6, 2013, now abandoned.

(51) Int. Cl.
*F16B 12/22* (2006.01)
*F16B 5/07* (2006.01)
*F16B 21/09* (2006.01)

(52) U.S. Cl.
CPC ............... *F16B 12/22* (2013.01); *F16B 5/07* (2013.01); *F16B 21/09* (2013.01); *Y10T 403/7096* (2015.01)

(58) Field of Classification Search
CPC ........ F16B 5/0036; F16B 12/10; F16B 12/20; F16B 12/22; F16B 12/24; F16B 12/34; F16B 12/36; F16B 12/46
See application file for complete search history.

(56) References Cited

U.S. PATENT DOCUMENTS

| | | | | |
|---|---|---|---|---|
| 3,894,377 A | * | 7/1975 | Welch ................... | F16B 12/22 403/353 |
| 4,473,316 A | * | 9/1984 | Welch ................... | F16B 12/22 248/222.41 |
| 8,104,989 B2 | * | 1/2012 | Liu ....................... | F16B 12/125 403/298 |
| 2011/0260592 A1 | * | 10/2011 | Lin ........................ | F16B 12/22 312/265.5 |
| 2012/0301217 A1 | * | 11/2012 | Liu ....................... | F16B 12/22 403/287 |

FOREIGN PATENT DOCUMENTS

CH             359263      *  2/1962  .............. F16B 12/22

* cited by examiner

*Primary Examiner* — Michael P Ferguson

(57) ABSTRACT

A simple engaging device comprises a locating base with at least a longitudinal hole, and at least a locating stem with an engaging head and a joining part corresponding to the longitudinal hole. Two flat locating parts are oppositely disposed at two lateral sides of the longitudinal hole; each flat locating part has a slant plane, a first slender retaining projection, a step, and a second slender retaining projection; the slant plane makes the joining part easy to be assembled and is capable of tightly guiding the joining part to reach the first slender retaining projection at which the joining part can be retained firmly without loosening, and the step and the second slender retaining projection are capable of engaging with the joining part in case of the engaging head and the joining part being worn out.

2 Claims, 6 Drawing Sheets

SIMPLE ENGAGING DEVICE

CROSS-REFERENCE TO RELATED APPLICATION

This application is a continuation-in-part application of application Ser. No. 13/786,797 filed on Mar. 6, 2013 by YA YUN YANG.

BACKGROUND OF THE INVENTION

1. Field of the Invention

The present invention relates to a simple engaging device, and more particularly to an engaging device capable of joining two flat pieces of furniture perpendicularly.

2. Description of Related Art

Currently, the engaging device for furniture available on the market is usually made of metal, plastics, or wood; the engaging device is attached to the flat pieces in advance with hand tools such as screw driver, pliers, and hammers before the flat pieces of the furniture are assembled. However, the user always meets following problems during setting up the modular furniture:

1. It needs much time to realize and classify the engaging device in order to avoid assembling mistakes to the flat pieces.

2. The engaging device is made of plastics, wood, or metal, and it is needed to use the hand tools not only to fix the engaging device to the flat pieces but also to assemble the flat pieces; the assembling job for the furniture becomes hard or impossible to be done without the hand tools.

3. Mostly, the engaging device is designed to be incapable of disengaging from the plates after assembling; incorrect assembly may result in the furniture is unable to be set up completely.

4. If the user is not good at engineering drawings, identifying the various parts of the modular furniture with the parts drawings often perplex the user.

U.S. Pat. No. 8,641,315 B2, which discloses a furniture connecting piece, and U.S. Pat. No.8,104,989 B2, which discloses a retaining structure, and U.S. Patent Publication No. 2011/0260592 A1, which discloses a combination cabinet, do not provide improvements to solve the preceding problems.

SUMMARY OF THE INVENTION

In order to improve the preceding deficiencies of the prior art, a simple engaging device according to the present invention comprises a locating base and at least a locating stem with an engaging head and a joining part; the locating base has a facial base section, a rear base section integrated with the facial base section as a single piece, and at least a longitudinal hole extending through the facial base section the rear base section; a distance between an end of the facial base section and an end of the rear base section near the end of the facial base section is different from and a distance between the other end of facial base section and the other end of the rear base section to offer a function of foolproof so as to avoid assembling mistakes; the longitudinal hole at the facial base section has two circular ends with one of the circular ends being an enlarged circular end and two lateral sides disposed with two identical flat locating parts oppositely; each of the flat locating parts has a slant plane disposed next to the enlarged circular end, a first slender retaining projection disposed near the slant plane, a step disposed next to the first slender retaining projection, and a second slender retaining projection disposed next to the other circular end of the longitudinal hole; the slant plane makes the joining part of the locating stem easy to be assembled and is capable of tightly guiding the engaging head and the joining part to the first slender retaining projection which is capable of secure the joining part firmly without loosening, and the step and the second slender retaining projection are capable of engaging the joining part to the locating parts during the engaging head and the joining part being worn out.

BRIEF DESCRIPTION OF THE DRAWINGS

Further benefits and advantages of the present invention will become apparent after a careful reading of the detailed description with appropriate reference to the accompanying drawings.

DETAILED DESCRIPTION OF THE INVENTION

Figure 1:
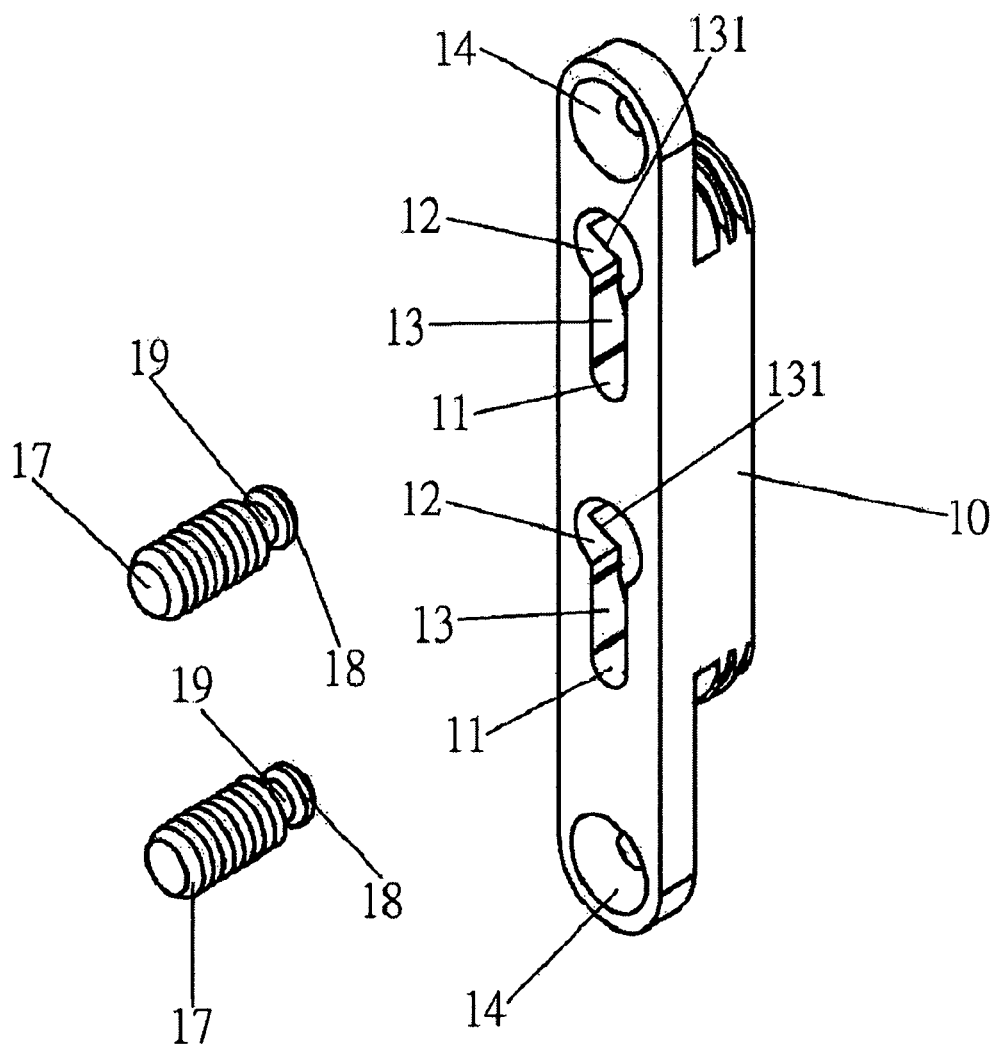
FIG. 1 is a front perspective view of a simple engaging device according to the present invention.
Figure 2:
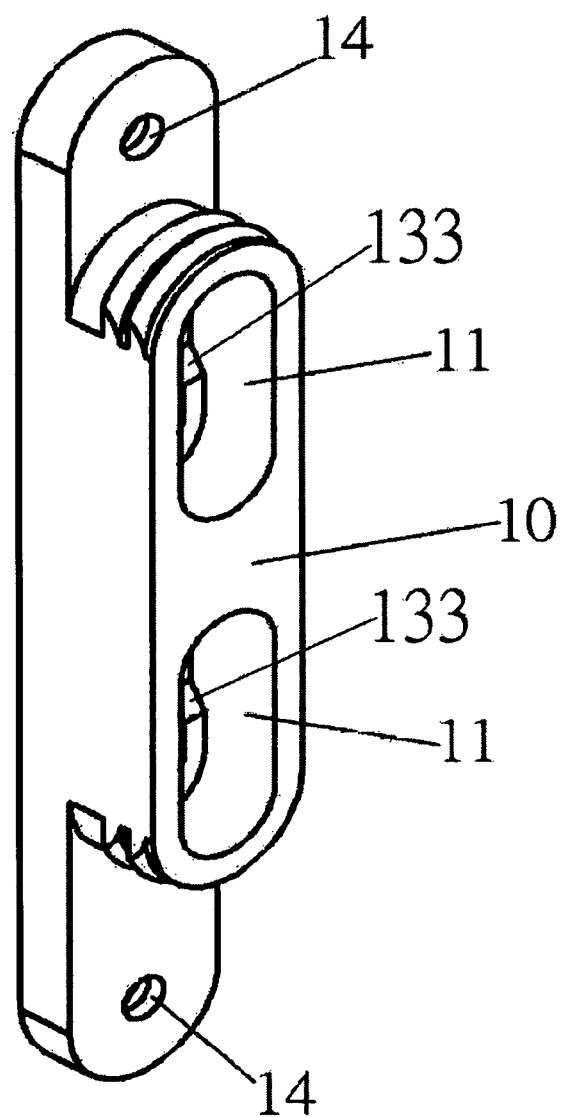
FIG. 2 is a rear perspective view of the locating base of the simple engaging device shown in FIG. 1.
Figure 3:
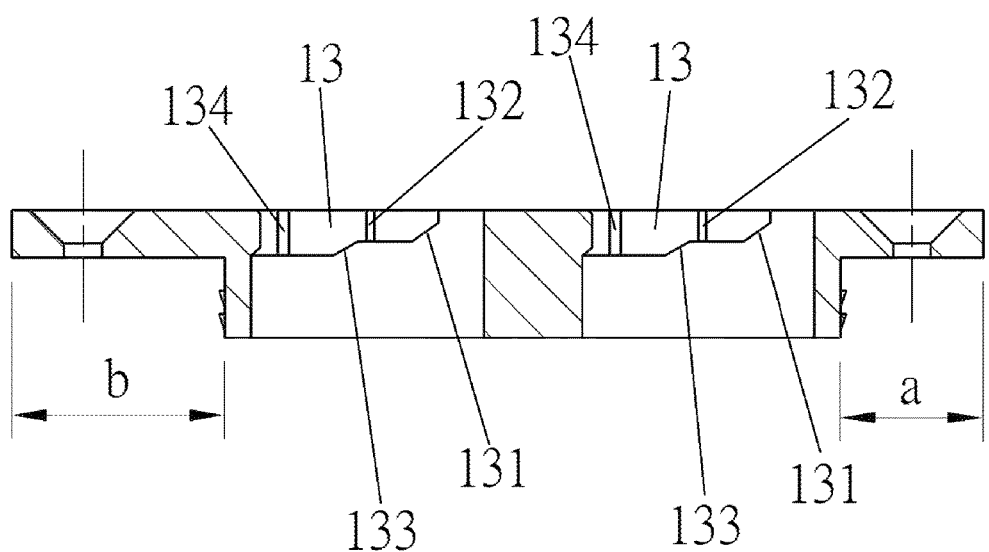
FIG. 3 is a sectional view of the locating base according to the present invention.

Referring to FIGS. 1 to 3, a preferred embodiment of the engaging device in accordance with the present invention basically has an elongated locating base 10 which has a facial base section, a rear base section integrated with the facial base section as a one piece, and two longitudinal holes 11 spaced apart from each other. The locating base 10 is embedded in a flat piece of furniture with the facial base section thereof being flush with the flat piece. The facial base section is longer than the rear section, and each of the two longitudinal holes 11 extends through the facial base section and the rear base section from the outer surface of the facial base section. Each longitudinal hole 11 at the facial base section has two circular ends and two lateral sides joining the circular ends with one of the circular ends being an enlarged circular end 12 and the lateral sides each disposed an identical flat locating part 13 opposite to each other. Each of the flat locating parts 13 has a slant plane 131 disposed next to and joining the enlarged circular end 12, a first slender retaining projection 132 disposed near the slant plane 131 and extending across the flat locating part 13, a step 133 disposed next to the first slender retaining projection 132 and extending to the other circular end of the respective longitudinal hole 11, and a second slender retaining projection 134 disposed next to the other circular end of the respective longitudinal hole 11 and extending across the respective flat locating part 13 and the step 133. Both ends of the facial base section of the locating base 10 have a fixing hole 14 respectively for the locating base 10 being retained at the flat piece with a screw engaging to the fixing hole 14. It is noted that a distance between an end of the facial base section and an end of the rear base section near the end of the facial base section is designated as "a", and a distance between the other end of facial base section and the other end of the rear base section is designated as "b" respectively in FIG. 3, and the distances "a" and "b" are different from each other to offer a function of foolproof so as to avoid the locating base 10 being assembled to the flat piece mistakenly.

A pair of locating stems 17, which correspond to the longitudinal holes 11, are joined to a lateral side of another flat piece of the furniture with an engaging head 18 and a joining part 19 extending outward the respective locating stem 17. The joining part 19 is disposed next to the engaging head 18 and has a reduced diameter to engage with the flat locating parts 13.

Figure 4A:
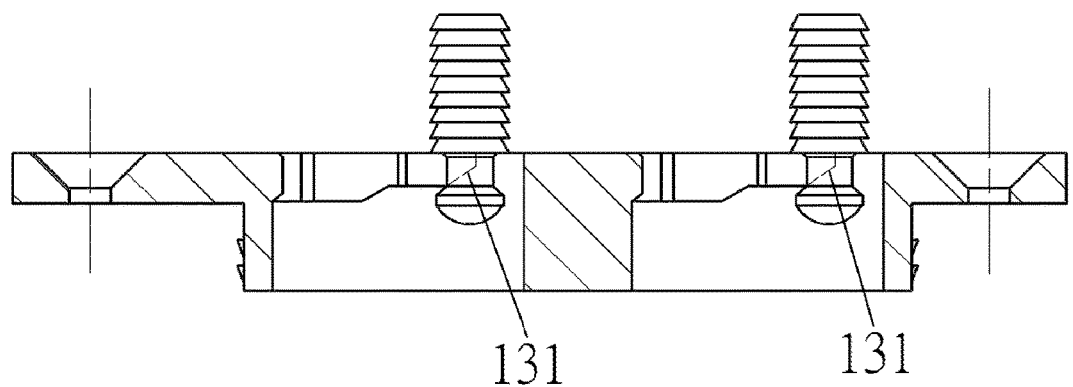
FIG. 4A is a sectional view illustrating the initial contact of the locating stem with the locating base according to the present invention.
Figure 4B:
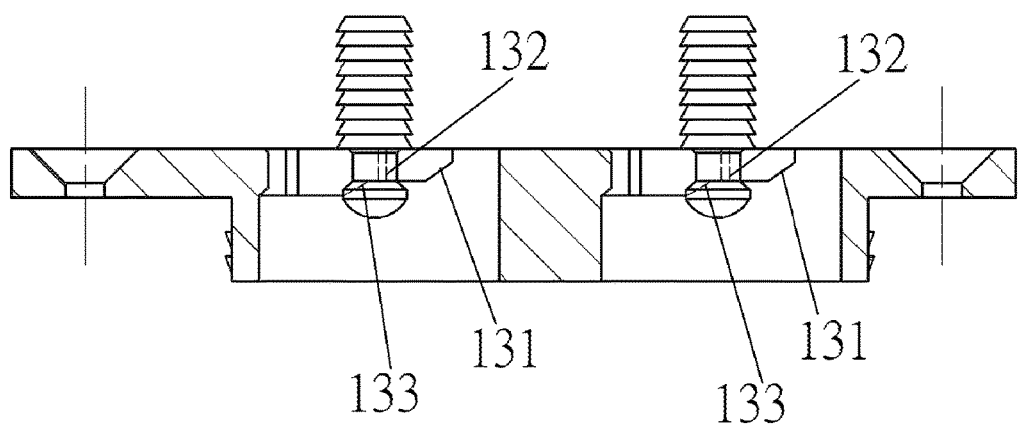
FIG. 4B is a sectional view illustrating the locating stem engaging with the locating base according to the present invention.

Please referring to FIGS. 4A and 4B in company with FIG. 1 again, when the engaging head 18 with the joining part 19 of each locating stem 17 is inserted into the corresponding longitudinal hole 11 via the enlarged circular end 12 as shown in FIG. 4A, the joining part 19 contacts with the slant plane 131; the slant plane 131 makes the joining part 19 easy to be assembled and is capable of tightly guiding the joining part 19 to a secured position; when the respective locating stem 17 is moved along the flat locating parts 13 toward the middle of the respective longitudinal hole 11, the joining part 19 can reach to contact and be retained by the first slender retaining projection 132; under the circumferences, the locating stems 17 can be secured firmly without loosening.

Figure 4C:
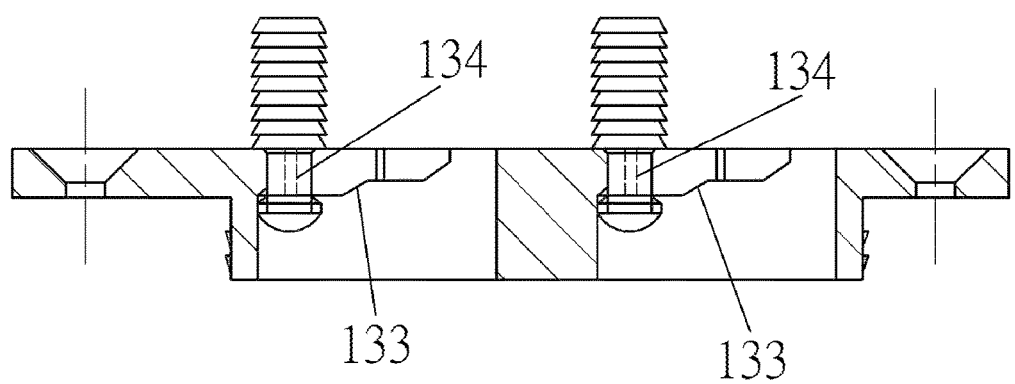
FIG. 4C is a sectional view illustrating the locating stem engaging with the locating base according to the present invention in case of the engagement shown in FIG. 4B becoming loosening.

Referring to FIG. 4C in company with FIGS. 1 and 4B again, in case of engaging head 18 and the joining part 19 shown in FIG. 4B being worn out and becoming loosening to engage with the locating parts 13 after a period of using, the respective locating stem 17 can be moved further to the other circular end of the respective longitudinal hole 11 to allow the joining part 19 being disposed to contact both the step 133 and the second slender retaining projection 134 as shown in FIG. 4C; under the circumferences, the joining part 19 is capable of engaging with the locating parts 13 even if the position shown in FIG. 4B is unable to carry out the engagement.

Although the invention has been explained in relation to its preferred embodiment, it is to be understood that many other possible modifications and variations can be made without departing from the spirit and scope of the invention as hereinafter claimed.

What is claimed is:

1. An engaging device in furniture with two flat pieces comprising:
   a locating base being embedded in one of the two flat pieces, and further comprising a facial base section with an outer surface, a rear base section integrated with the facial base section as one piece, and at least one longitudinal hole (11) extending through the facial base section and the rear base section from the outer surface;
   at least one locating stem being embedded in the other one of the two flat pieces corresponding to the longitudinal hole (11), and having an engaging head (18) at a distal end thereof and a joining part (19) extending outward from and embedded within the flat piece;
   wherein the facial base section and the rear base section have two ends respectively, and the facial base section is longer than the rear base section with a distance (a) between one of the two ends of the facial base section and one of the two ends of the rear base section near the end of the facial base section being different from a distance (b) between the other end of facial base section and the other end of the rear base section to offer a function of foolproof assembly so as to avoid assembling mistakes;
   wherein the longitudinal hole (11) at the facial base section has two circular ends and two lateral sides joining the two circular ends with one of the circular ends being an enlarged circular end (12) and the lateral sides each comprising a flat locating part (13) opposite and identical to each other to engage with the joining part (19), and wherein each flat locating part (13) has a slant plane (131) opposite the outer surface disposed next to and joining the enlarged circular end (12), a first slender retaining projection (132) disposed near the slant plane (131) and extending across the flat locating part (13) toward the rear base section, a step (133) opposite the outer surface disposed next to the first slender retaining projection (132) and extending to the other circular end along the flat locating part (13), and a second slender retaining projection (134) disposed near the other circular end and extending across the flat locating part (13) and the step (133) toward the rear base section; and
   wherein the engaging head is inserted into the longitudinal hole via the enlarged circular end and slid along the flat locating parts toward the other circular end such that the slant plane (131) slidably engages the engaging head and tightly guides the joining part (19) to reach the first slender retaining projection (132) which is capable of securing the joining part (19) firmly without loosening, and the step (133) slidably engages the engaging head and tightly guides the joining part to reach the second slender retaining projection (134) which is capable of engaging with the joining part (19) in case of the engaging head (18) and the joining part (19) being worn out.

2. The engaging device as defined as claim 1, wherein the locating base has two longitudinal holes disposed spaced apart from each other, and two locating stems are provided corresponding to the two longitudinal holes respectively.

* * * * *